(12) United States Patent
Katukam (10) Patent No.: US 7,082,124 B1
(45) Date of Patent: Jul. 25, 2006

(54) METHOD AND APPARATUS FOR COMPUTING PRIMARY AND ALTERNATE PATHS IN MIXED PROTECTION DOMAIN NETWORKS

(75) Inventor: Suresh Katukam, Rohnert Park, CA (US)

(73) Assignee: Cisco Technology, Inc., San Jose, CA (US)

(*) Notice: Subject to any disclaimer, the term of this patent is extended or adjusted under 35 U.S.C. 154(b) by 858 days.

(21) Appl. No.: 09/903,217

(22) Filed: Jul. 10, 2001

(51) Int. Cl.
*H04L 12/66* (2006.01)

(52) U.S. Cl. ............................ 370/357; 370/352
(58) Field of Classification Search ............ 370/355, 370/216–228
See application file for complete search history.

(56) References Cited

U.S. PATENT DOCUMENTS

| | | | |
|---|---|---|---|
| 5,253,248 A | 10/1993 | Dravida et al. | 370/16 |
| 5,459,716 A | 10/1995 | Fahim et al. | |
| 5,467,345 A | 11/1995 | Cutler, Jr. et al. | 370/60 |
| 5,497,368 A | 3/1996 | Reijnierse et al. | 370/54 |
| 5,627,822 A | 5/1997 | Edmaier et al. | 370/218 |
| 5,854,899 A | 12/1998 | Callon et al. | 395/200.68 |
| 5,923,646 A * | 7/1999 | Mandhyan | 370/254 |
| 6,073,248 A | 6/2000 | Doshi et al. | 714/4 |
| 6,078,590 A | 6/2000 | Farinacci et al. | 370/432 |
| 6,185,210 B1 | 2/2001 | Troxel | 370/395 |
| 6,430,150 B1 | 8/2002 | Azuma et al. | |
| 6,542,468 B1 * | 4/2003 | Hatakeyama | 370/238 |
| 6,646,990 B1 * | 11/2003 | Gray et al. | 370/238 |
| 6,671,819 B1 * | 12/2003 | Passman et al. | 714/4 |
| 6,751,190 B1 | 6/2004 | Swallow | |
| 6,765,880 B1 * | 7/2004 | Hillard et al. | 370/255 |
| 6,895,091 B1 * | 5/2005 | Elliott et al. | 380/278 |
| 2002/0131431 A1 * | 9/2002 | Wank et al. | 370/403 |
| 2003/0076816 A1 * | 4/2003 | Naranjo et al. | 370/352 |

* cited by examiner

*Primary Examiner*—Hassan Kizou
*Assistant Examiner*—Jay P. Patel
(74) *Attorney, Agent, or Firm*—Aka Chan LLP (57) ABSTRACT

Methods and apparatus for automatically routing paths in a network with a mixed protection domain. According to one aspect, a method for computing a primary path within a network includes identifying a plurality of potential paths which are characteristically similar and are arranged between the source node and the destination node and selecting a first potential path from the plurality of potential paths which are characteristically similar. The first potential path is considered for use as an actual path between the source node and the destination node, while the other potential paths included in the plurality of potential paths which are characteristically similar are not considered for use as the actual path between the source node and the destination node.

34 Claims, 9 Drawing Sheets

METHOD AND APPARATUS FOR COMPUTING PRIMARY AND ALTERNATE PATHS IN MIXED PROTECTION DOMAIN NETWORKS

BACKGROUND OF THE INVENTION

1. Field of Invention

The present invention relates generally to data communication systems. More particularly, the present invention relates to systems and methods for creating a primary path between nodes of a mixed protection network that is protected by an alternate path.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

To address the demand for data communication services, the use of optical networks, such as a synchronous optical network (SONET), is becoming more prevalent. As will be appreciated by those skilled in the art, a SONET network is an example of a time division multiplexed (TDM) network. TDM networks generally allocate single lines to be used amongst multiple users, or customers of data communication services. The single lines may each be divided into slots of time during which each user has access to the single lines.

A network such as a TDM network is generally designed to ensure that information may be transferred between nodes within the network. Often, within a network, information is transferred between two specified nodes, i.e., a source node which sends information and a destination node which receives information. When information is to be sent between a source node and a destination node, a circuit path between the two nodes must be computed so that leased line services may be provided.

Often, to increase the likelihood that data will be successfully transferred, a circuit path between a source node and a destination node may be protected. A protected circuit path may include protected links, e.g., links with 1+1 protection. A protected circuit path may also include unprotected links, provided that there is a corresponding alternate circuit path associated with the unprotected links. An alternate circuit path effectively serves as a "back up" path to a primary circuit path which includes unprotected links in the event that the primary circuit path fails. For instance, when a primary circuit path suffers either a nodal failure or a failure of a link, data that was to be sent through the primary circuit path may be sent through the alternate circuit path instead. As some protected circuit paths may include both protected path segments and unprotected segments, some protected paths may include "partial" alternate path segments which correspond to the unprotected segments.

Figure 1:
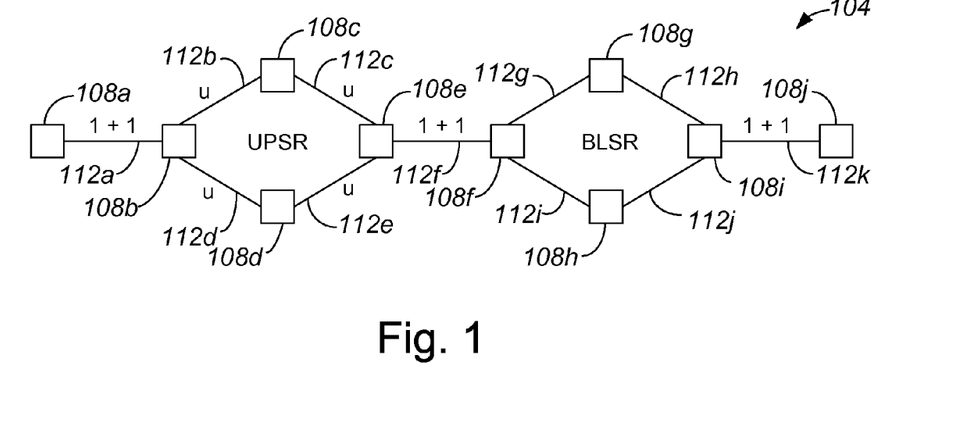
FIG. 1 is a diagrammatic representation of a network with a mixed protection domain.

Networks which include both protected links and unprotected links are considered to be networks with mixed protection domains. FIG. 1 is a diagrammatic representation of one conventional network with a mixed protection domain. A network 104 includes nodes 108 and links 112 which are arranged to include a unidirectional path switched ring (UPSR) and a bidirectional line switched ring (BLSR). Links 112 may either be protected, as for example through '1+1' protection, or unprotected. Links 112a, 112f, and 112k are protected, while links 112b–e, which are included in a UPSR, may be unprotected. Typically, to route a circuit path from node 108a to node 108j, since network 104 includes overlapping domains, e.g., overlapping unprotected and protected domains, the circuit path includes both protected and unprotected links.

Network 104 may represent a communications network which includes metropolitan networks. By way of example, the UPSR may be a representation of a metropolitan network in one city, and the BLSR may be a representation of a metropolitan network in another city. Link 112f, which is characterized by 1+1 protection, may be a core which allows the UPSR to communicate with the BLSR.

Figure 2:
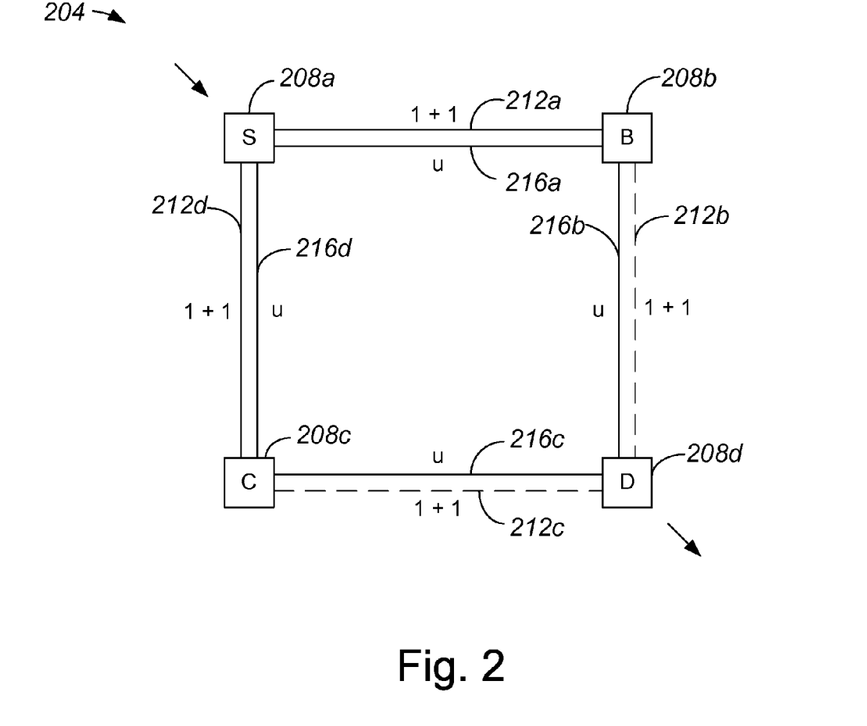
FIG. 2 is a diagrammatic representation of a network in which includes multiple paths between two nodes.

Often, within a communications network that includes metropolitan networks, there may be multiple paths between two nodes. In other words, there may be more than one potential circuit path between a particular source node and a particular destination node. FIG. 2 is a diagrammatic representation of a network which includes multiple paths between two nodes. A network 204 includes a local source node 208a and a local destination node 208d, as well as intermediate nodes 208b, 208c. Nodes 208 are interconnected by links 212, 216. Links 212 are protected links, and links 216 are unprotected links. As nodes 208 are interconnected by both protected links 212 and unprotected links 216, e.g., local source node 208a and node 208b are connected by both protected link 212a and unprotected link 216a, network 204 is a mixed protection domain network with overlapping protections.

Typically, when segment of an overall circuit path is to be routed between local source node 208a and local destination node 208d, the path that is chosen is the shortest path between local source node 208a and local destination node 208d which meets particular requirements, e.g., which is protected if a protected path is desired or unprotected if an unprotected path is desired. As will be appreciated by those skilled in the art, an overall circuit path is often assumed to be the shortest path between a source node and a destination node when the segments which make up the overall path are each the shortest available segment between local source and destination nodes.

If an unprotected path between local source node 208a and local destination node 208d is desired, then either a path which uses links 216a, 216b, or a path which uses links 216d, 216c may be selected. If a protected path between local source node 208a and local destination node 208d is desired, unprotected links 216a, 216b may be chosen to make up a primary path, while unprotected links 216d, 216c may be chosen to make up an alternate path to the primary path. As shown, a protected path between local source node 208a and local destination node 208d is not possible using protected links 212, since link 212b and link 212c are each full and have no available bandwidth. Hence, neither a protected path using links 212d, 212c nor a protected path using links 212a, 212b is possible.

In general, when a path is to be selected, substantially all possible paths between a source node and a destination node are considered. By way of example, if a path between local source node 208a and local destination node 208d is to be routed, then all eight possible paths between local source node 208a and local destination node 208d are considered. That is, a path which includes links 212a, 212b, a path which includes links 212d, 212c, a path which includes links 216a, 216b, a path which includes links 216d, 216c, a path which includes links 212a, 216b, a path which includes links 212b, 216a, a path which includes links 212c, 216d, and a path which includes links 212d, 216c are explored.

Exploring multiple paths often proves to be inefficient, as the time and the cost associated with exploring each path may be significant. Often, the multiple paths may include paths which are characteristically the same. Considering multiple paths that are characteristically similar is particularly inefficient especially when a network which includes the multiple paths is a mixed protection domain network with domains which overlap, as circuit paths within such networks must typically be manually created by a network administrator. That is, conventional path routing algorithms such as shortest path first (SPT) algorithms generally may not be used to automatically create circuits or circuit paths in a network with overlapping domains.

Therefore, what is needed is a system and a method for automatically routing circuit paths in networks with overlapping domains. Specifically, what is needed is an efficient system and method for automatically creating circuit paths in mixed protection domain networks that explores representative potential paths of each available characteristic type.

SUMMARY OF THE INVENTION

The present invention relates to automatically routing paths in a network with a mixed protection domain. According to one aspect of the present invention, a method for computing a primary path within a network includes identifying a plurality of potential paths which are characteristically similar, or have similar protection characteristics, and are arranged between the source node and the destination node and selecting a first potential path from the plurality of potential paths which are characteristically similar. The first potential path is considered for use as an actual path between the source node and the destination node, while the other potential paths included in the plurality of potential paths which are characteristically similar are not considered for use as the actual path between the source node and the destination node. In one embodiment, selecting the first potential path involves determining a cost of each potential path of the plurality of potential paths which are characteristically similar. The first potential path is selected because the cost of the first potential path is lower than the cost of substantially all other potential paths which are characteristically similar to the first potential path.

In another embodiment, a second potential path which is characteristically different from the first potential path is identified as being potentially suitable for use as the actual path between the source node and the destination node. In such an embodiment, considering the first potential path for use as the actual path between the source node and the destination node includes comparing the first potential path with the second potential path and selecting one of the first potential path and the second potential path for use as the actual path.

Having a shortest path first algorithm consider substantially only one path of each given characteristic reduces the costs associated with selecting a shortest available path between two nodes in a mixed protection domain network. In order to consider substantially only one path from a set of potential paths that are characteristically similar, the set of potential paths that are characteristically similar are pruned. Typically, pruning results in the path with the lowest cost being selected from the set of potential paths for consideration. Hence, when an actual path between two nodes is selected, the selection is generally made from a group of potential paths which are each the lowest cost path from their respective sets of characteristically similar paths.

According to another aspect of the present invention, an apparatus for computing a primary path within a network includes computer code that causes an identification of a first potential path and a second potential path, the first potential path and the second potential path being characteristically similar, and each being arranged between a source node and a destination node. The apparatus also includes computer code that causes a selection of the first potential path, and computer code that causes a consideration of the first potential path for use as an actual path between the source node and the destination node. The second potential path is not considered for use as the actual path between the source node and the destination node. Finally, the apparatus includes a processor that executes the computer codes and a computer-readable medium that stores the computer codes.

In one embodiment, the computer code that causes the selection of the first potential path includes computer code that causes a determination of a cost of the first potential path and a cost of the second potential path. The first potential path is selected when the cost of the first potential path is less than the cost of the second potential path. In another embodiment, the apparatus also includes computer code that causes an identification of a third potential path for use as the actual path between the source node and the destination node. The third potential path being characteristically different from the first potential path.

According to still another aspect of the present invention, a method for computing a primary path within a network with a mixed protection domain includes identifying a plurality of potential paths which begin at a first node and end at a second node. The plurality of potential paths includes a first set of potential paths that have a first characteristic and a second set of potential paths that have a second characteristic. The method also includes selecting a first potential path from the first set of potential paths; and selecting a second potential path from the second set of potential paths. A path is identified for use in transferring a signal between the first node and the second node. The path for use in transferring a signal is identified from a third set of potential paths which includes the first potential path and the second potential path and substantially no other potential paths included in the first set of potential paths and the second set of potential paths.

In one embodiment, identifying the path for use in transferring the signal includes evaluating a cost associated with each potential path in the third set of potential paths. A potential path included in the third set of potential paths has an associated cost that is lower than costs associated with other potential paths included in the third set of potential paths, the potential path is identified as the path for use in transferring the signal. In another embodiment, substantially each potential path included in the third set of potential paths is characteristically different from substantially every other potential path included in the third set of potential paths.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Within a network such as a time division multiplexed (TDM) network which is subject to synchronous optical network (SONET) standards, networks often include mixed protection domains. That is, networks often are not either completely protected or completely unprotected, and may not easily be divided into multiple domains. Conventional shortest path first (SPT) algorithms are generally not capable of routing circuit paths within networks which have mixed protection domains. As such, when efficient paths, or paths which have a low cost, are to be routed in mixed protection domain networks which may not be easily divided into multiple domains, network administrators often must create paths manually, which is typically an inefficient process.

An SPT which identifies substantially all possible paths from a source node to a destination node within a network with a mixed protection domain may eliminate some paths from consideration in routing data from the source node to the destination node. Paths which are eliminated, or pruned, may generally be paths with similar characteristics, e.g., similar protection characteristics. Hence, when the SPT is to select an actual path for use in transferring data signals in a network which includes paths which are characteristically different, the possible paths which the SPT may choose from include only one possible path of each characteristic. In other words, no two paths from which the SPT may select an actual path are characteristically similar, as a result of a pruning process.

The use of an SPT which is suitable for routing a path between two nodes, or network elements, in a network with a mixed protection domain enables paths to be routed automatically, e.g., using a computer, and efficiently. The efficiency of routing a path using an SPT may be attributed, at least in part, to substantially eliminating the need for a network administrator to route a path. In addition, using the SPT to prune potential paths from consideration as an actual path between two nodes, i.e., from further expansion, reduces the amount of time and the number of resources needed to route paths.

To avoid an explosion in the number of paths between two nodes that are considered for use as a part or an actual path, an SPT prunes a "tree" or list of potential paths. In one embodiment, the paths may be pruned such that when alternate paths which correspond to the paths exist, their availability as alternate paths is effectively ensured. One method for effectively ensuring that an alternate path is available if one exists is described in co-pending U.S. patent application Ser. No. 09/872,177, filed Jun. 1, 2001, which is incorporated herein by reference in its entirety. The SPT nay be further arranged such that essentially no additional computational requirements are needed when paths are computed in networks which do not have mixed protection domains.

Figure 3A:
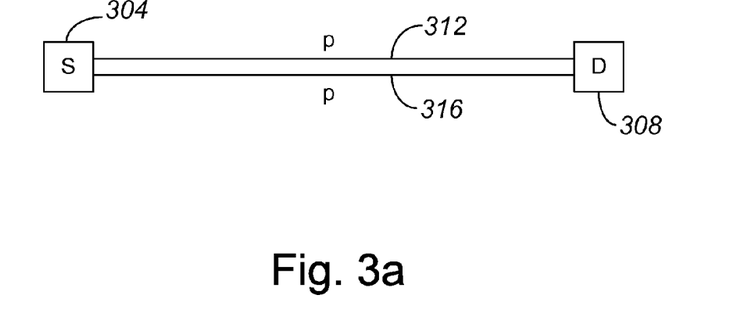
FIG. 3a is a diagrammatic representation of a source node and a destination node which include paths which have the same characteristic.

Paths which are characteristically similar are paths which have the same protection characteristic or characteristics. By way of example, FIG. 3a is a diagrammatic representation of a source node and a destination node which include paths which have the same characteristic. A source node 304 and a destination node 308 are linked by segments 312 and 316. Specifically, segments 312 and 316, which are characteristically similar or similar in nature, e.g., have similar protection configurations, are alternative paths between source node 304 and destination node 308. In the described embodiment, segments 312 and 316 are considered to have the same protection characteristic in that each of segments 312 and 316 include substantially only protected links.

Figure 3B:
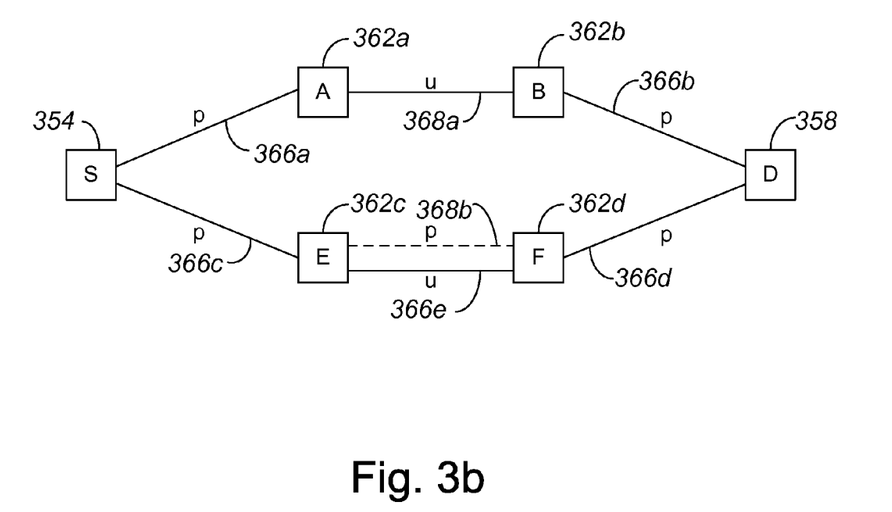
FIG. 3b is a diagrammatic representation of a network with a mixed protection domain which includes alternative paths which have the same protection characteristics.

FIG. 3b is a diagrammatic representation of a network with a mixed protection domain which includes alternative paths which have the same protection characteristics and, hence, are considered to be characteristically similar. A source node 354 and a destination node 358 may be accessed using one of two characteristically similar paths. A first path, which includes protected segments 366a, 366b and unprotected segment 368a, passes through nodes 362a, 362b. A second path, which includes protected segments 366c, 366d and unprotected segment 368b, passes through nodes 362c, 362d. It should be appreciated that although nodes 362c and 362d are also connected by protected link 366e, as shown, protected link 366e is full and, therefore, may not be used as a part of a path between source node 354 and destination node 358. The first and second paths are characteristically similar in that their protection configurations are similar, i.e., the first path and the second path each have a protected segment followed by an unprotected segment and another protected segment.

In general, protected segments 366 may include links with '1+1' protection or bi-directional line switched rings (BLSRs). Typically, protected segments 366 may represent any number of links with 1+1 protection or BLSRs. It should be appreciated that protected segments 366 may also include unprotected links which have corresponding alternate links.

Figure 4A:
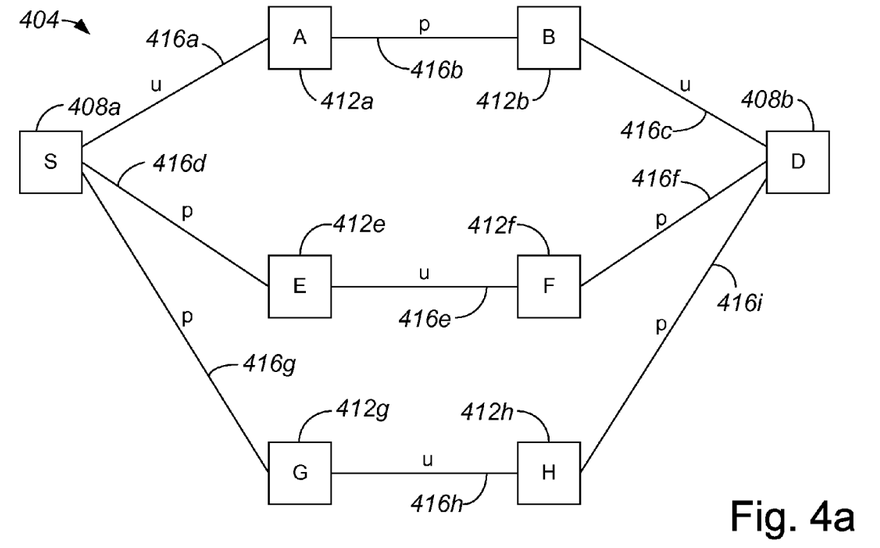
FIG. 4a is a diagrammatic representation of a mixed protection domain network with characteristically similar circuit paths.

When a network or a portion of a network includes alternative paths which have the same characteristics, exploring all of the alternative paths for use as an actual path may prove to be time consuming and, hence, inefficient. As previously mentioned, removing all but one of the characteristically similar paths from consideration increases the efficiency with which paths may be routed. FIG. 4a is a diagrammatic representation of a portion of a network which includes nodes and segments, and has a mixed-protection domain. A network 404 includes a source node 408a and a destination node 408b, as well as nodes 412. Nodes 412 may be considered as intermediate nodes or intermediate switches, as nodes 412 are associated with segments or portions of a circuit path between nodes 408. Network 404 also includes segments 416 which include links over which data signals may be transmitted between nodes 408, 412. Some segments 416, e.g., segment 416a, are unprotected segments and are designated by a 'u.' Other segments 416, such as segment 416d, are protected segments, e.g., segments which include links that have '1+1' protection or BLSRs.

It should be appreciated that in one embodiment, segments 416 are path segments between nodes 408, 412, and may include multiple links. Alternatively, segments 416 may include a single link. By way of example, unprotected path segment 416a may be a representation of a plurality of unprotected links and at least one node, while protected path segment 416b may include substantially only a single protected link. In general, the number of links and nodes included in segments 416 may vary widely.

Within network 404, there are three different circuit paths between source node 408a and destination node 408b. A first path includes segments 416a–c, and passes through nodes 412a and 412b. A second path includes segments 416d–f, and passes through nodes 412e and 412f. A third path which includes segments 416g–i and passes through nodes 412g and 412h has the same characteristics as the second path, i.e., is characteristically similar to the second path. That is, both the second path and the third path include a protected segment, followed by an unprotected segment, and another protected segment. In the described embodiment, the second path includes protected segment 416d, unprotected segment 416e, and protected segment 416f, while the third path includes protected segment 416g, unprotected segment 416h, and protected segment 416i.

It should be understood that although the first path, like the second path and the third path, includes both protected segments 416 and unprotected segments 412, the first path is not considered to be characteristically similar to the second path and the third path because the orientation, layout, or order of protected segments 416 and unprotected segments 412 is not the same for the first path as it is for the second path and the third path. Specifically, as the first path includes unprotected segment 416a, which is followed by protected segment 416b, and unprotected segment 416c, the first path is not considered as having the same characteristics as the second and third paths. Therefore, while three paths between source node 408 and destination node 408b may exist that each include protected segments 416 and unprotected segments 412, network 404 is considered as including two different types of paths, or paths of two different characteristics.

When a path is to be selected for use in transferring data from source node 408a to destination node 408b, considering all three available paths may inefficient, since two of the available paths have the same characteristics. In other words, considering only paths within network 404 which have different, e.g., unique, characteristics allows an actual path to be selected without having to consider every potential path, which may be inefficient. Accordingly, one of the characteristically similar paths may be removed from consideration, e.g., pruned from a list of paths that are being considered for selection. Pruning a path from consideration may involve studying the cost of substantially all paths of the same characteristic, and selecting only the path with the lowest cost for consideration as the actual path used to transfer data between source node 408a and destination node 408b. In one embodiment, the cost of a path is determined based upon the number of links included in the path. It should be appreciated that in the event that two characteristically similar paths have the same cost, the determination of which path to prune may be arbitrary. Alternatively, a path may be pruned if it does not include a virtual tributary (VT) tunnel while another path does, as a VT tunnel may be preferred.

Figure 4B:
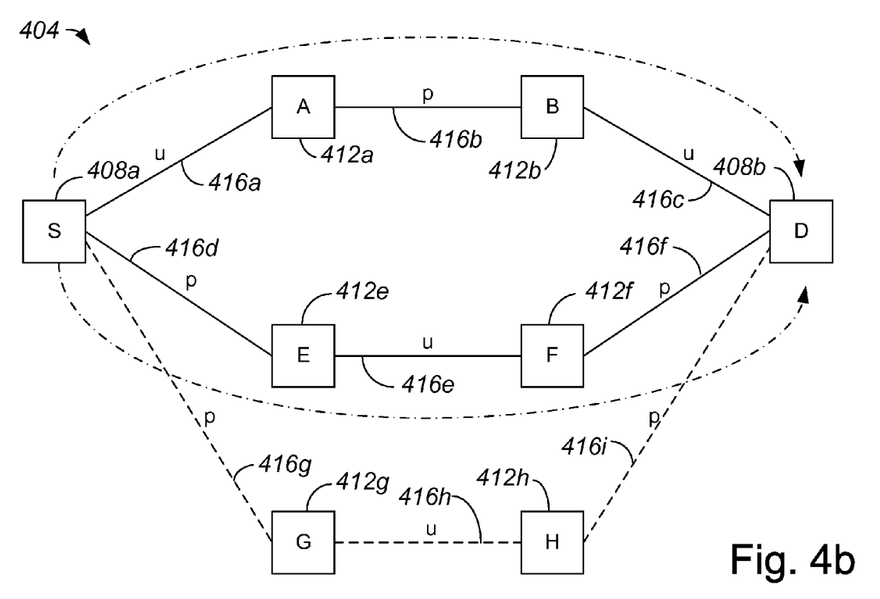
FIG. 4b is a diagrammatic representation of a mixed protection domain network, i.e., network 404 of FIG. 4a, in which one circuit path has been pruned in accordance with an embodiment of the present invention.

In the embodiment as shown, the second path and the third path are studied in order to determine which of the paths is to be pruned. As shown in FIG. 4b, the third path which includes segments 416g–i is pruned from consideration such that only characteristically different paths within network 404 are considered for use in transferring data. That is, only the first path which includes segments 416a–c and the second path which includes segments 416d–f are to be considered for selection for expansion and as the actual path used to route data between source node 408a and destination node 408b.

The pruning of characteristically similar paths and the selection of a suitable path between a source node and a destination node may generally be performed by a SPT algorithm. As will be appreciated by those skilled in the art, an SPT algorithm, which may execute on either a computing device that is in communication with a network or on a node of a network, typically identifies a shortest path between a source node and a destination node. In the described embodiment, an SPT algorithm which is suitable for pruning characteristically similar paths also identifies characteristically similar paths within a network that is of mixed protection domains, then studies the cost of the characteristically similar paths before selecting one of the characteristically similar paths for further consideration against characteristically different paths.

Figure 5:
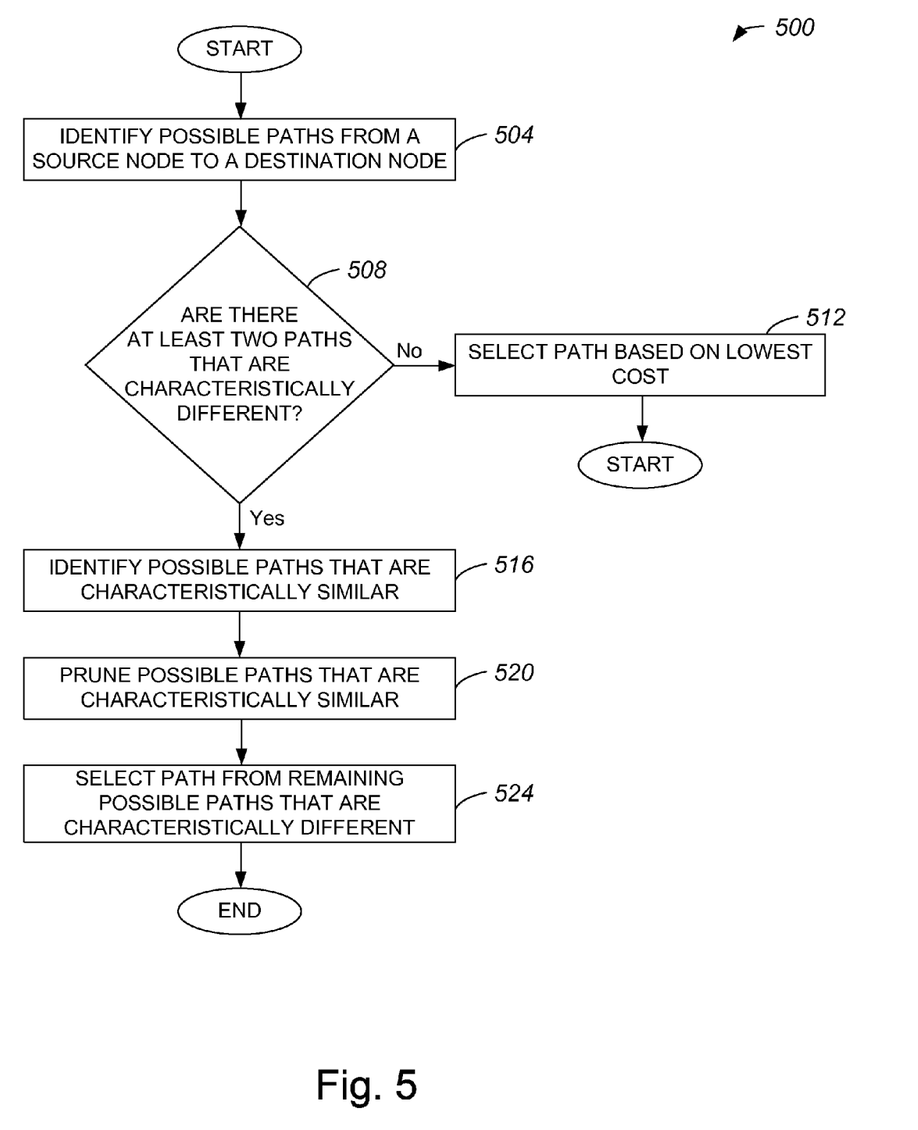
FIG. 5 is a process flow diagram which illustrates the steps associated with computing a circuit path in accordance with an embodiment of the present invention.

With reference to FIG. 5, one method of computing a path between a source node and a destination node will be described in accordance with an embodiment of the present invention. A process 500 of computing a path begins at step 504 in which a set of possible paths from a source node to a destination node are identified, as for example by an SPT algorithm. That is, a set of paths which are available that enable the destination node to be reached from the source node are identified. One method of computing a path between nodes will be discussed below with reference to FIGS. 6a–c.

After the possible paths are identified in step 504, a determination is made in step 508 regarding whether there are at least two paths that are characteristically different. For example, if one path has all protected links and another path has all unprotected links, the two paths are considered to have protection characteristics that are characteristically different, as discussed above. If it is determined that there are not at least two paths that are characteristically different, then the indication is that all possible paths between the source node and the destination node are characteristically the same. Accordingly, process flow moves to step 512 in which one of the characteristically similar paths, or paths with similar protection configurations, is selected. Typically, the path with the lowest cost, e.g., fewest links, is selected. As will be appreciated by those skilled in the art, the path with the lowest cost may also be the path that includes the fewest links while including a link or links which are required by a network administrator. Once the path with the lowest cost is selected, the process of computing a path between a source node and a destination node is completed.

Returning to step 508, if it is determined that there are at least two paths that are characteristically different, then in step 516, substantially all possible paths that are characteristically similar are identified. By way of example, all paths which include only unprotected links and all paths which include only protected links may be identified. After characteristically similar paths are identified, the characteristically similar paths are pruned in step 520. Pruning, or reducing the number of, paths generally involves elimination paths until substantially one path of each characteristic remains. For instance, if there are three paths which include only unprotected links, pruning the paths which include only unprotected links reduces the number of paths in consideration, or possible paths, which include unprotected links to one. The steps associated with pruning possible paths will be described below with respect to FIG. 7.

Once the paths are pruned such that each possible remaining path is characteristically different, a path is selected in step 524 to be the path over which a signal is routed from the source node to the destination node. The selection of a path may be based on substantially any suitable criteria. Suitable criteria include, but are not limited to, the cost associated with each path, the available bandwidth on each path. After the path is selected, the process of computing a path is completed.

Figure 6A:
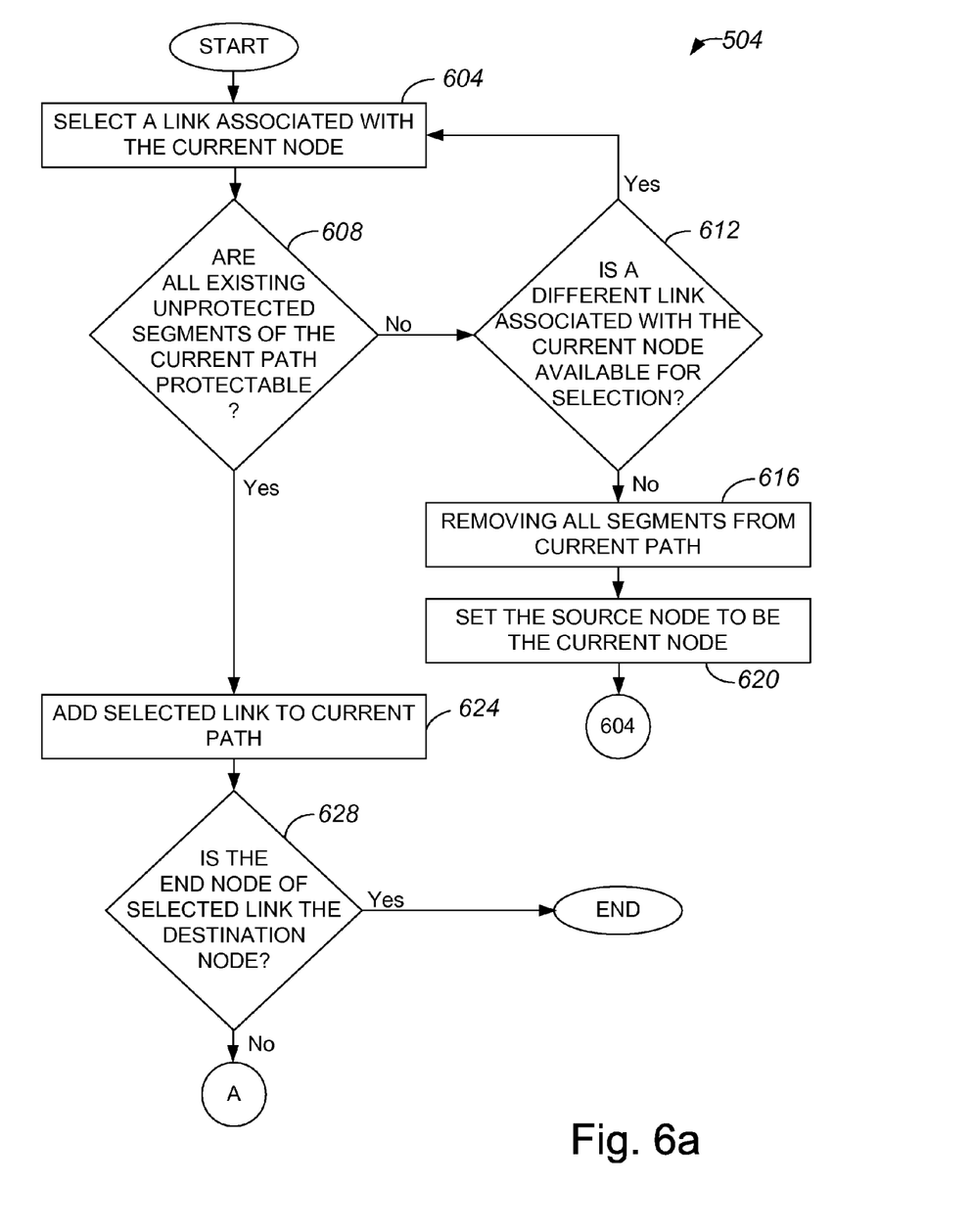
FIGS. 6a–6c are a process flow diagram which illustrates the steps associated with one method of identifying potential circuit paths between a source node and a destination node, i.e., step 504 of FIG. 5, in accordance with an embodiment of the present invention.
Figure 6B:
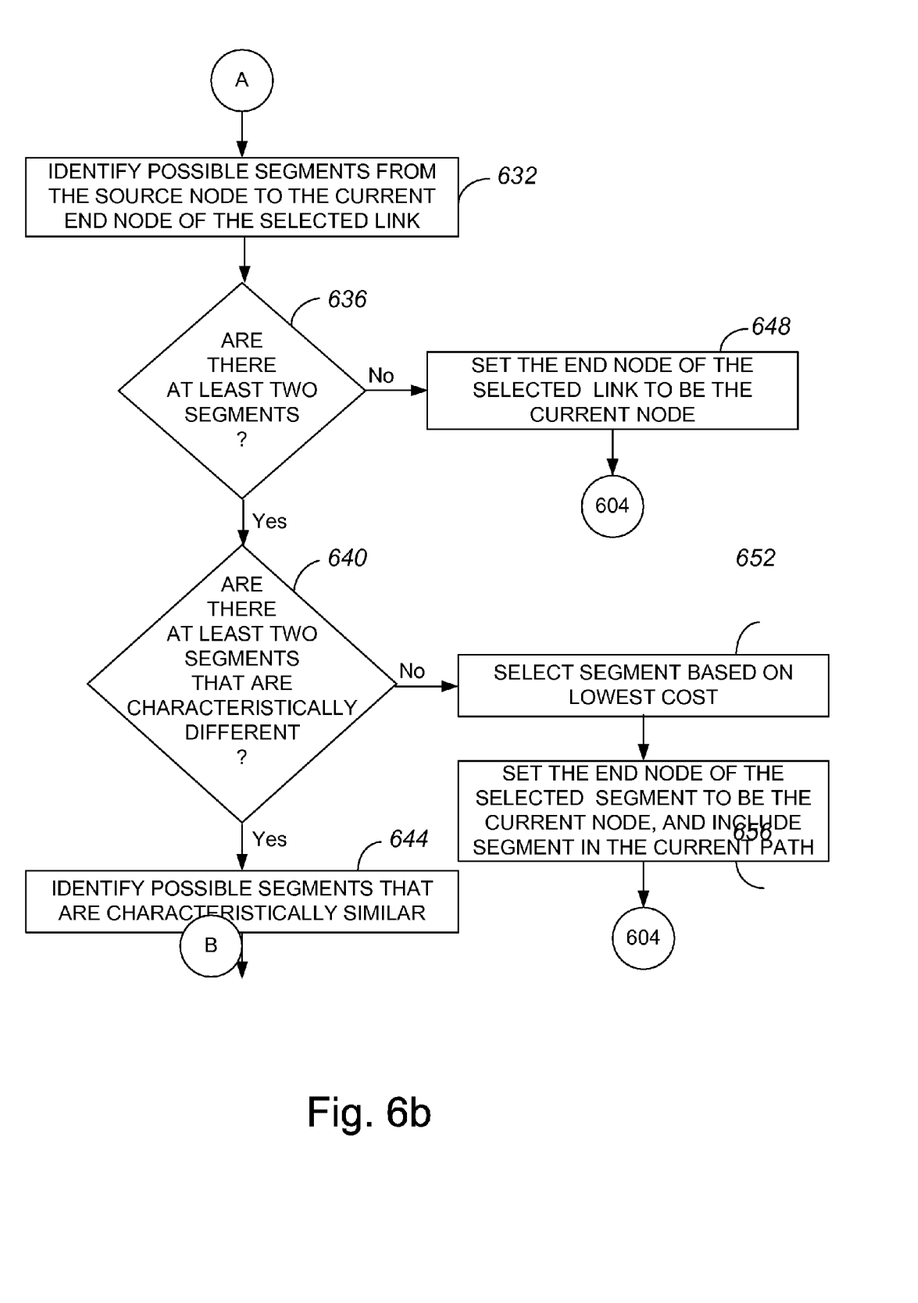
Figure 6C:
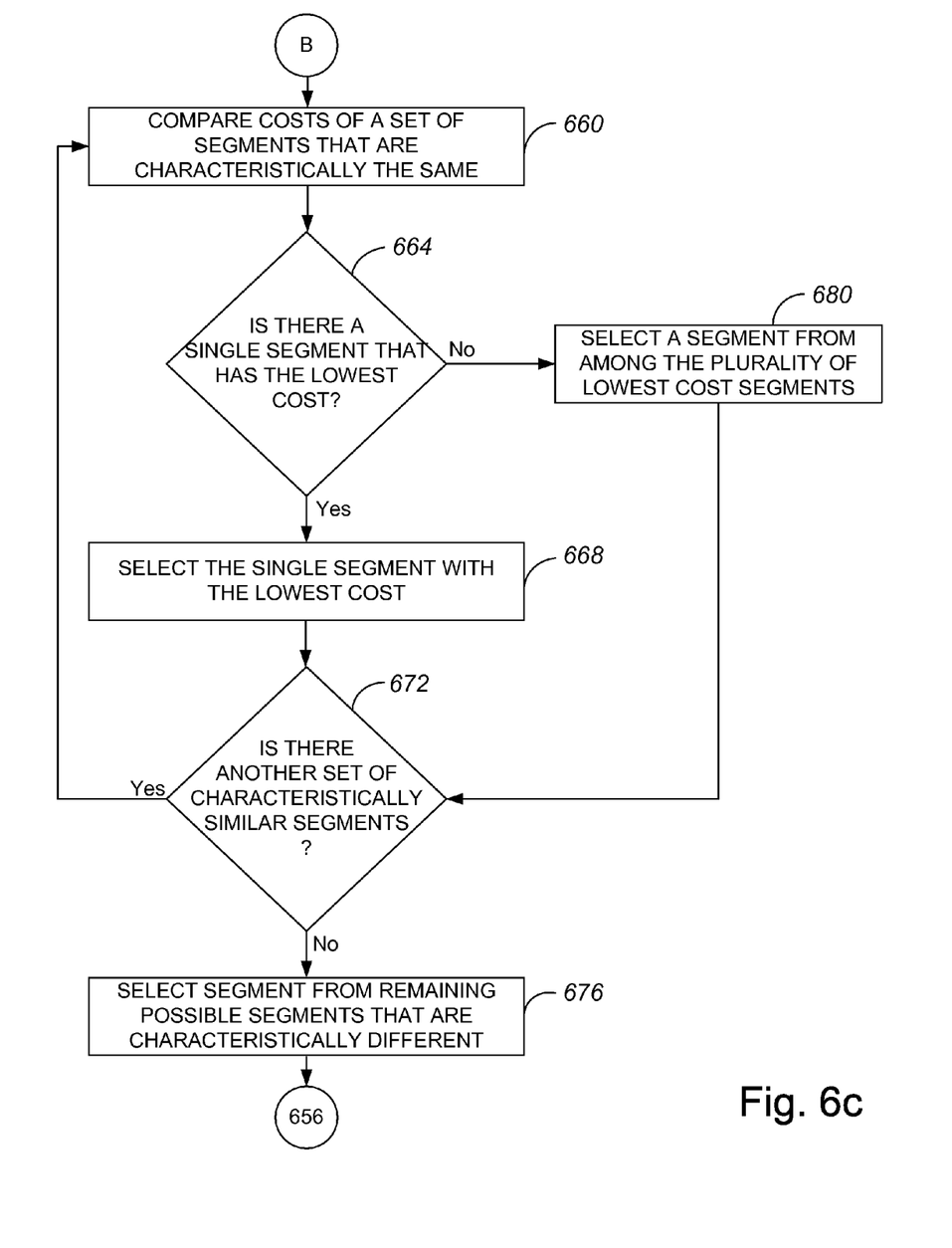

FIGS. 6a–c is a process flow diagram which illustrates the steps associated with identifying a path between nodes, i.e., step 504 of FIG. 5, in accordance with an embodiment of the present invention. Although process 504 will be described in terms of identifying a single path between nodes, it should be appreciated that process 504 as shown in FIGS. 6a–c may be repeated until multiple available paths between a source node and a destination node are identified. In other words, process 504 as shown in FIGS. 6a–c illustrates the steps associated with identifying a single potential path between a source node and a destination node. Hence, process 504 as shown in FIGS. 6a–c may be repeated until a set of potential paths between the source node and the destination node are identified. In one embodiment, the set of potential paths may be a set of substantially all available potential paths.

Process 504 begins at step 604 in which a link associated with a current node is identified to be potentially included in a current path. The current node, which may be the source node of a path, is the node from which the selected link is initiated. After the link is selected, a determination is made in step 608 as to whether all existing unprotected segments of the current path, which were previously protectable, are still protectable after the link is selected in step 604. In other words, the current path to which the selected link may be added is studied to determine if any unprotected segments which are included in the current path may be protected by an alternate path segment. An alternate path segment typically includes unprotected links and provides an alternate route over which a signal may be transmitted in the event that the corresponding path segment fails. As will be appreciated by those skilled in the art, a previously protectable segment of the current path may no longer be protectable if the link selected in step 604 is a link which was previously allocated for use in protecting a segment of the current path.

In the described embodiment, a protected circuit path is desired. If it is determined in step 608 that all existing unprotected segments of the current path may not be protected, then a determination is made in step 612 regarding whether there is a different link associated with the current node that may be selected for inclusion in the current path. In other words, it is determined whether there is at least one alternative link to the link selected in step 604. If there is an alternative link, then process flow returns to step 604 in which a link associated with the current node is selected.

When it is determined in step 612 that there is no alterative link to select, then the indication is that the current path is not completely protectable. Accordingly, process flow moves to step 616 in which substantially all segments included in the current path are removed. That is, the current path is effectively dismantled. Once the segments in the current path are removed, the source node is set as the current node in step 620, and process flow returns to step 604 in which a link associated with the current node is selected.

Returning to step 608, if it is determined that substantially all existing unprotected segments of the current path are protectable, or that there are no already existing unprotected segments of the current path, the selected link is added to the current path in step 624. Then, in step 628, a determination is made as to whether the end node of the selected link, i.e., the node at which the selected link terminates, is the destination node of the overall circuit path. When it is determined that the end node is the destination node, then the indication is that a path has been identified between the source node and the destination node. As such, the process of identifying a possible path is completed.

Alternatively, if the determination in step 628 is that the end node of the selected link is not the destination node, then in step 632, a set of possible segments between the source node and the current end node of the selected link are identified. Substantially all available possible segments between the source node and the current end node of the selected link are identified in the described embodiment to enable characteristically similar segments to be pruned. It should be appreciated, however, that path segments may not necessarily be pruned in other embodiments.

A determination is made in step 636 as to whether there are at least two path segments in existence between the source node and the current end node. If it is determined that there are not at least two segments, then the indication is that only the current segment is available between the source node and the current end node of the selected link. Accordingly, process flow proceeds to step 648 in which the end node of the selected link is set as the new current node. Once the new current node is set, process flow returns to step 604 in which a link associated with the current node is selected.

Alternatively, if the determination in step 636 is that there are two or more segments which are available between the source node and the current end node, then it is determined in step 640 if there are at least two possible or potential segments that are characteristically different. When it is determined that there are at least two segments that are characteristically different, process flow proceeds to step 644 in which possible segments that are characteristically similar are identified. Once the characteristically similar segments are identified, the costs of substantially all segments between the source node and the current end node of the selected link are compared in step 660.

After the costs of segments that are characteristically the same are compared in step 660, a determination is made in step 664 as to whether there is a single segment that has the lowest cost of all of the characteristically similar segments. If it is determined that there is one segment which has a lower cost than the other characteristically similar segments, that segment is selected in step 668. That is, the remaining segments are effectively pruned from consideration. Once the segment is selected, it is determined if there is another set of characteristically similar segments in step 672.

If the determination in step 672 is that there is not another set of characteristically similar segments to process or to prune, then a segment is selected for expansion in step 676. Specifically, a segment is selected from a set of possible segments that are each characteristically different from all other segments in the set. Process flow then moves to step 656 in which the end node of the selected segment, i.e., the segment selected in step 676, is set as the current node, and the selected segment is included in the current path. Then, process flow returns to step 604 in which a link associated with the current node is selected Alternatively, if the determination in step 672 is that there is another set of characteristically similar segments to process, then process flow returns to step 660 in which the costs of the set of segments that are characteristically the same are compared.

Returning to step 664, if it is determined that there is no single segment that has a lower cost than all other segments with the same characteristics, the implication is that there are at least two characteristically similar segments with the same lowest cost. Accordingly, a segment may be selected from amongst substantially all segments with the same cost using substantially any suitable criteria. By way of example, the selection may either be arbitrary or based upon the inclusion of a particular feature in one of the segments, e.g., the presence of a VT tunnel.

Referring back to step 640 and the determination of whether there are at least two segments that are characteristically different, if it is determined that two or more segments that are characteristically different are not available, then the implication is that the available segments are characteristically similar. Hence, a segment is selected based upon cost in step 652, although it should be appreciated that a segment may also be selected based on other criteria. Once a segment is selected, the end node of the selected segment is set to be the current node, and the segment is included in the current path in step 656. After the current node is set, process flow then returns to step 604 in which a link associated with the current node is selected.

Figure 7:
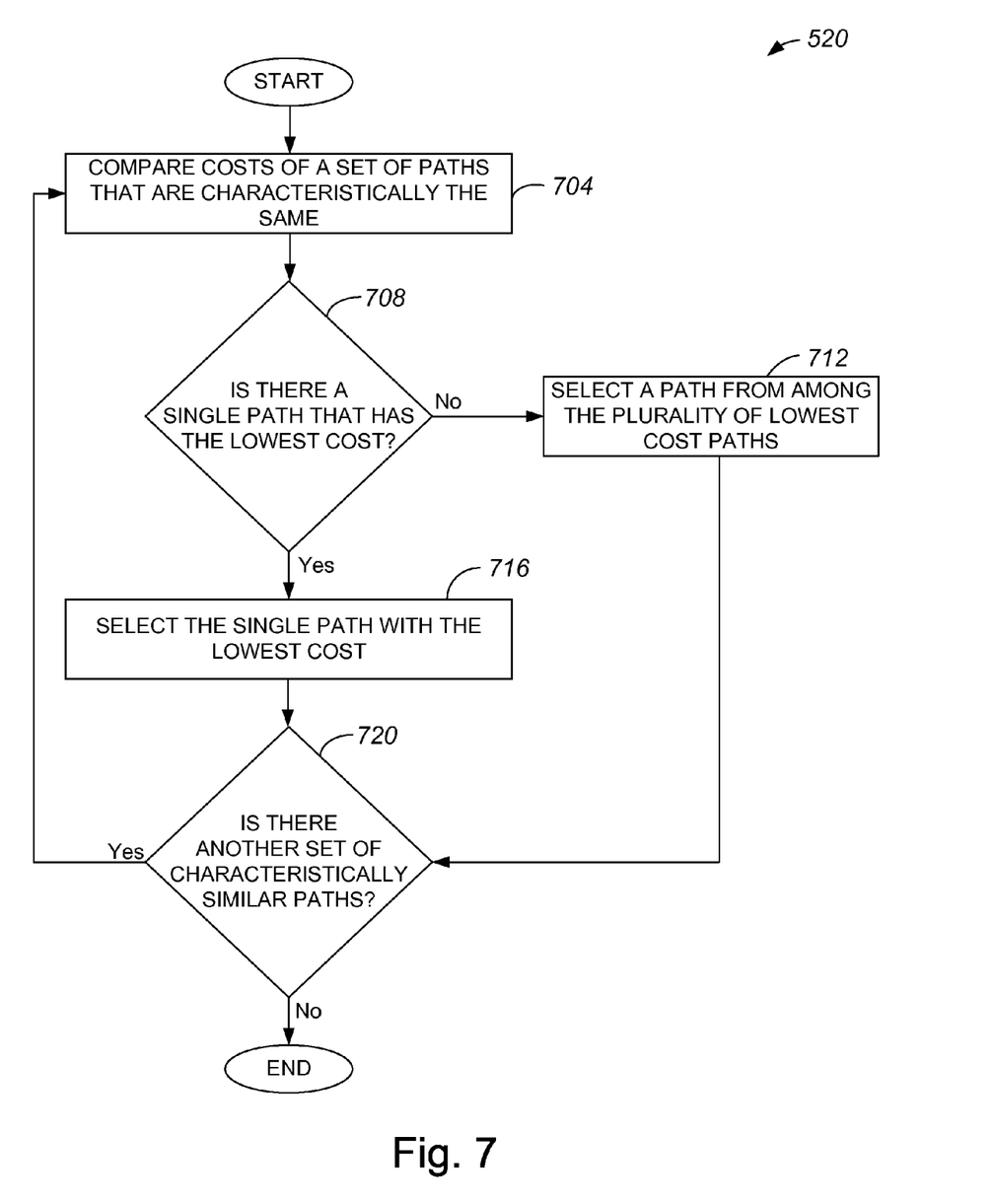
FIG. 7 is a process flow diagram which illustrates the steps associated with one method of pruning characteristically similar circuit paths, i.e., step 520 of FIG. 5, in accordance with an embodiment of the present invention.

As discussed above with respect to FIG. 5, paths between a source node and a destination node which have a particular characteristic are pruned such that substantially only one of the paths with the particular characteristic is considered for selection as the path to actually use to allow data to be transferred between the source node and the destination node. Hence, when a selection of a path to use in sending data between the source node and the destination node is made, the selection is made from among paths that are all characteristically different from one another. FIG. 7 is a process flow diagram which illustrates the steps associated with pruning possible paths, i.e., step 520 of FIG. 5, in accordance with an embodiment of the present invention. A process 520 of pruning paths begins at step 704 in which the costs of a set of paths which are characteristically the same are compared. In general, comparing the costs of the set of paths may include studying the number of links in each set of paths. Once the comparison is completed, a determination is made in step 708 regarding whether there is a single path that has a lowest cost. That is, it is determined if there is one path that has a lower cost than all the other paths which have the same characteristic.

If it is determined in step 708 that there is one path in the set of characteristically similar paths that has a lower cost than the other paths in the set, then in step 716, the single path with the lowest cost is selected. As previously mentioned, the path with the lowest cost in the set is typically chosen, e.g., by an SPT algorithm, to be considered for use in actually allowing a signal to be transmitted between a source node and a destination node. After the single path is selected, process flow proceeds to step 720 in which it is determined if there is another set of characteristically similar paths to process. If there are no characteristically similar paths to process, then the process of pruning paths is completed. Alternatively, if it is determined that there is at least one other set of characteristically similar paths to process, then process flow returns to step 704 in which the costs of the next set of paths that are characteristically the same are compared.

Returning to step 708 and the determination of whether there is a single path that has a lower cost than all other paths in a set of characteristically similar paths, if it is determined that there is no single path that is lower in cost than the rest of the characteristically similar paths, then the indication is that there are at least two paths that have the same cost. As such, a path is chosen in step 712 from among all paths that have the lowest cost in the set of characteristically similar paths. The criteria used in selecting the path from among the lowest cost paths may vary. In one embodiment, the path that is chosen may be the path which uses links which have the most available bandwidth. After the path is chosen, process flow proceeds to step 720 in which it is determined if there is another set of characteristically similar paths to process.

Figure 8:
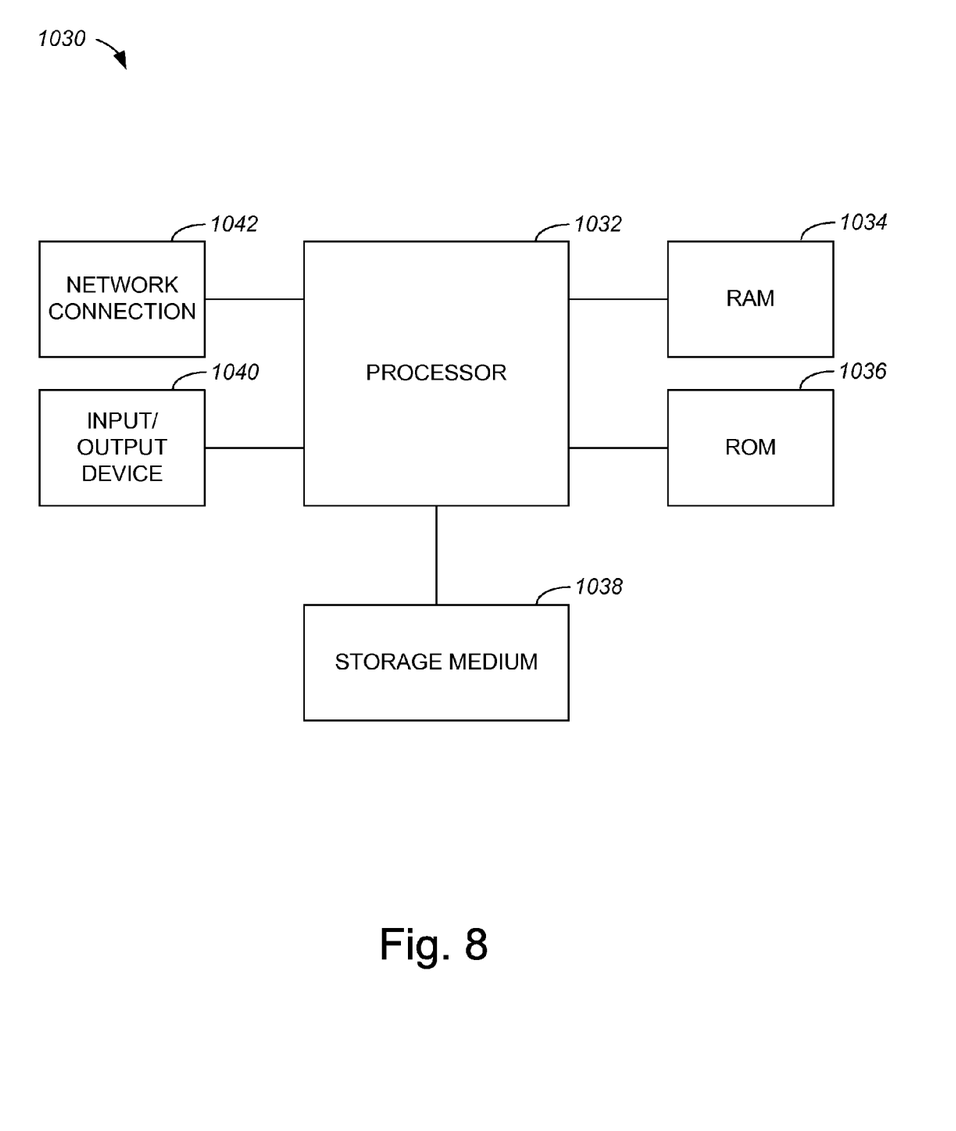
FIG. 8 is a diagrammatic representation of a computing system suitable for implementing the present invention.

The present invention may be implemented on a computing device which is in communication with a network element, e.g., a node, within a SONET, or substantially any other suitable network. In one embodiment, the computing device may be a part of a node. FIG. 8 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, while the present invention has been described as being suitable for use with respect to a TDM network that is subject to SONET standards, the present invention is suitable for a variety of different networks. Other suitable networks include, but are not limited to, networks that are subject to a synchronous digital hierarchy (SDH) standard.

While the SPT of the present invention has been described as being suitable for use in a network with a mixed protection domain, it should be appreciated that SPT is also suitable for use in networks which do not have a mixed protection domain. For example, the SPT may be used in a network which includes only unprotected links. Within such a network, if it is determined that a suitable path between two nodes is to be unprotected, then the existence of an alternate path is generally not considered in determining a suitable path between the two nodes.

In one embodiment, when substantially all segments of a current path are removed when it is determined that the current path is no longer protectable, the removed segments may be monitored or otherwise tracked to effectively ensure that the same combination of segments is not used when a new current path is identified. Substantially preventing the same combination of segments may eliminate the time and overhead associated with routing a path, as a determination that the same combination of segments is not protectable may be avoided. In other words, time and resources associated with routing a path may generally be conserved by preventing a current path which has previously not been protectable from being routed again.

In general, the steps associated with methods of computing a protected circuit path may be widely varied. Steps may be added, removed, altered, or reordered without departing from the spirit or the scope of the present invention. For example, step 616 of FIG. 6 discusses removing substantially all segments from a current path when the existing segments of the current path are not protectable. Instead of removing all segments of a current path at one time, one segment may be removed at a time, and links may be added to the current path which no longer includes the removed segment. If the removal of one segment does not result in all existing unprotected segments of the current path being protectable, another segment may be removed, and links may be added to the current path which no longer includes two removed segments. That is, rather than rerouting an entire current path, only parts of the current path may be rerouted instead without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for computing a primary path within a mixed protection domain network, the network including a plurality of nodes and a plurality of links, the plurality of nodes including a source node and a destination node, the method comprising:

identifying substantially all potential paths arranged between the source node and the destination node, wherein identifying substantially all the potential paths includes selecting a first link, the first link being arranged between the source node and a first node included in the plurality of nodes, selecting a second link, the second link being associated with the first node, and determining when the first link and the second link are protectable, wherein when the first link and the second link are protectable, the first link and the second link are added to a potential path, and wherein the first link and the second link form a potential path segment, and determining when the first link and the second link are protectable includes determining when an alternate potential path segment associated with the source node and the first node exists for the potential path segment;

identifying a plurality of potential paths which are characteristically similar, each of the plurality of potential paths which are characteristically similar having at least one similar protection characteristic and being arranged between the source node and the destination node;

selecting a first potential path from the plurality of potential paths which are characteristically similar; and identifying a second potential path for use as an actual path between the source node and the destination node, the second potential path being characteristically different and having at least one different protection characteristic from the first potential path;

comparing the first potential path with the second potential path for use as the actual path between the source node and the destination node, wherein other potential paths included in the plurality of potential paths which are characteristically similar are not considered for use as the actual path between the source node and the destination node.

2. A computer program product for computing a primary path within a mixed protection domain network, the network including a plurality of nodes and a plurality of links, the plurality of nodes including a source node and a destination node, the computer program product comprising:

computer code that causes substantially all potential paths arranged between the source node and the destination node to be identified, wherein the computer code that causes substantially all the potential paths to be identified includes computer code that causes a first link to be selected, the first link being arranged between the source node and a first node included in the plurality of nodes, computer code that causes a second link to be selected, the second link being associated with the first node, and computer code that causes a determination to the made regarding when the first link and the second link are protectable, wherein when the first link and the second link are protectable, the first link and the second link are added to a potential path, wherein the first link and the second link form a potential path segment, and the computer code that causes the determination to be made regarding when the first link and the second link are protectable includes computer code that causes a determination to be made regarding when an alternate potential path segment associated with the source node and the first node exists for the potential path segment;

computer code that causes a plurality of potential paths which are characteristically similar to be identified, each of the plurality of potential paths which are characteristically similar having at least one similar protection characteristic and being arranged between the source node and the destination node;

computer code that causes a first potential path to be selected from the plurality of potential paths which are characteristically similar;

computer code that causes a second potential path for use as an actual path between the source node and the destination node to be identified, the second potential path being characteristically different and having at least one different protection characteristic from the first potential path;

computer code that causes the first potential path and the second potential path to be considered for use as the actual path between the source node and the destination node, wherein other potential paths included in the plurality of potential paths which are characteristically similar are not considered for use as the actual path between the source node and the destination node; and a computer-readable medium that stores the computer codes.

3. An apparatus for computing a primary path within a mixed protection domain network, the network including a plurality of nodes and a plurality of links, the plurality of nodes including a source node and a destination node, the apparatus comprising:

computer code that causes an identification of a first potential path and a second potential path, the first potential path and the second potential path each being arranged between the source node and the destination node, the first potential path and the second potential path being characteristically similar in that the first potential path and the second potential path have at least one similar protection characteristic;

computer code that causes a selection of the first potential path;

computer code that causes a third potential path between the source node and the destination node to be identified as being characteristically different and having at least one different protection characteristic from the first potential path and the second potential path;

computer code that causes a comparison of the first potential path with the third potential path, for use as an actual path between the source node and the destination node, wherein the second potential path is not considered for use as the actual path between the source node and the destination node;

a computer-readable medium that stores the computer codes; and a processor that executes the computer codes.

4. The apparatus according to claim 3 wherein the computer code that causes the selection of the first potential path includes:

computer code that causes a determination of a cost of the first potential path and a cost of the second potential path, wherein the first potential path is selected when the cost of the first potential path is less than the cost of the second potential path.

5. The apparatus according to claim 3 further including:
computer code that selects one of the first potential path and the third potential path for use as the actual path.

6. The apparatus according to claim 5 wherein the computer code that causes a comparison of the first potential path to the third potential path includes computer code that causes a comparison of a cost of the first potential path with a cost of the third potential path, and the computer code that causes a selection of one of the first potential path and the third potential path for use as the actual path includes computer code that causes a selection the first potential path for use as the actual path when the cost of the first potential path is lower than the cost of the second potential path and the computer code that causes a section of the third potential path for use as the actual path when the cost of the third potential path is lower than the cost of the first potential path.

7. The apparatus according to claim 3 further including:
computer code that causes an identification of substantially all potential paths arranged between the source node and the destination node.

8. The apparatus according to claim 3 wherein the computer code that causes the identification of the first potential path includes:

computer code that causes a selection of a first link, the first link being arranged between the source node and a first node included in the plurality nodes;

computer code that causes a selection or a second link, the second link being associated with the first node; and computer code that causes a determination of when the first link and the second link are protectable, wherein when the first link and the second link are protectable, the first link and the second link are added to the first potential path.

9. The apparatus according to claim 8 wherein the first link and the second link form a potential path segment, and the computer code that causes the determination of when the first link and the second link are protectable includes computer code that causes a determination of when an alternate potential path segment associated with the source node and the first node exists for the potential path segment.

10. An apparatus for computing a primary path within a mixed protection domain network, the network including a plurality of nodes and a plurality of links, the plurality of nodes including a source node and a destination node, the apparatus comprising:

means for identifying a first potential path and a second potential path, the first potential path and the second potential path each being arranged between the source node and the destination node, the first potential path and the second potential path being characteristically similar having at least one similar protection characteristic;

means for selecting the first potential path;

means for identifying a third potential path for use as an actual path between the source node and the destination node, the third potential path being characteristically different and having at least one different protection characteristic from the first potential path and from the second potential path; and means for comparing the first potential path with the third potential path for use as an actual path between the source node and the destination node, wherein the second potential path is not considered for use as the actual path between the source node and the destination node.

11. The apparatus according to claim 10 wherein the means for selecting the first potential path includes:

means for determining a cost of the first potential path and a cost of the second potential path, wherein the first potential path is selected when the cost of the first potential path is less than the cost of the second potential path.

12. The apparatus according to claim 10
   means for selecting one of the first potential path and the third potential path for use as the actual path.

13. The apparatus according to claim 12 wherein the means for comparing the first potential path to the third potential path includes means for comparing a cost of the first potential path with a cost of the third potential path, and the means for selecting one of the first potential path and the third potential path for use as the actual path includes means for selecting the first potential path for use as the actual path when the cost of the first potential path is lower than the cost of the second potential path and the means for selecting the third potential path for use as the actual path when the cost of the third potential path is lower than the cost of the first potential path.

14. The apparatus according to claim 10 wherein the means for identifying the first potential path includes:
   means for selecting a first link, the first link being arranged between the source node and a first node included in the plurality of nodes;
   means for selecting a second link, the second link being associated with the first node; and
   means for determining when the first link and the second link are protectable, wherein when the First link and the second link are protectable, the first link and the second link are added to the first potential path.

15. The apparatus according to claim 14 wherein the first link and the second link form a potential path segment, and the means for determining when the first link and the second link are protectable includes means for determining when an alternate potential path segment associated with the source node and the first node exists for the potential path segment.

16. A method for computing a primary path within a network with a mixed protection domain, the network including a plurality of nodes, the method comprising:
   identifying a plurality of potential paths which begin at a first node and end at a second node, the plurality of potential paths including a first set of potential paths that have a first protection characteristic and a second set of potential paths that have a second protection characteristic;
   selecting a first potential path from the first set of potential paths;
   selecting a second potential path from the second set of potential paths; and
   identifying a path for use in transferring a signal between the first node and the second node, the path for use in transferring the signal being identified from a third set of potential paths which includes the first potential path and the second potential path and substantially no other potential paths included in the first set or potential paths and the second set of potential paths.

17. The method as recited in claim 16 wherein selecting the first potential path from the first set of potential paths includes:
   determining costs associated with each potential path from the first set of potential paths, wherein a cost associated with the first potential path is lower than the costs associated with other potential paths in the first set of potential paths.

18. The method as recited in claim 16 wherein selecting the second potential path from the second set of potential paths includes:
   determining costs associated with each potential path from the second set of potential paths, wherein a cost associated with the second potential path is lower than the costs associated with other potential paths in the second sot of potential paths.

19. The method as recited in claim 16 wherein identifying the path for use in transferring the signal includes:
   evaluating a cost associated with each potential path in the third set of potential paths, wherein a potential path included in the third set of potential paths has an associated cost that is lower than costs associated with other potential paths included in the third set of potential paths, the potential path is identified as the path for use in transferring the signal.

20. The method as recited in claim 16 wherein substantially each potential path included in the third set of potential paths has different protection characteristics from substantially every other potential path included in the third set of potential paths.

21. The method of claim 16 wherein the first protection characteristic is different from the second protection characteristic.

22. A computer program product for computing a primary path within a network with a mixed protection domain, the network including a plurality of nodes, the computer program product comprising:
   computer code that causes an identification of a plurality of potential paths which begin at a first node and end at a second node, the plurality of potential paths including a first set of potential paths that have a first protection characteristic and a second set of potential paths that have a second protection characteristic;
   computer code that causes a selection or a first potential path from the first set of potential paths;
   computer code that causes a selection of second potential path from the second set of potential paths;
   computer code that causes an identification of a path for use in transferring a signal between the first node and the second node, the path for use in transferring the signal being identified from a third set of potential paths which includes the first potential path and the second potential path and substantially no other potential paths included in the first set of potential paths and the second set of potential paths; and
   a computer-readable medium that stores the computer codes.

23. The computer program product as recited in claim 22 wherein the computer code that causes the selection of the first potential path from the first set of potential paths includes:
   computer code that causes a determination of costs associated with each potential path from the first set of potential paths, wherein a cost associated with the first potential path is lower than the costs associated with other potential paths in the first set of potential paths.

24. The computer program product as recited in claim 22 wherein the computer code that causes the selection of the second potential path from the second set of potential paths includes:
   computer code that causes a determination of costs associated with each potential path from the second set of potential paths, wherein a cost associated with the second potential path is lower than the costs associated with other potential paths in the second set of potential paths.

25. The computer program product as recited in claim 22 wherein the computer code that causes an identification of the path for use in transferring the signal includes:
   computer code that causes an evaluation of a cost associated with each potential path in the third sot of potential paths, wherein a potential path included in the third set of potential paths has an associated cost that is lower than costs associated with other potential paths included in the third set of potential paths, the potential path is identified as the path for use in transferring the signal.

26. The computer program product as recited in claim 22 wherein substantially cacti potential path included in the third set of potential paths is characteristically different from substantially every other potential path included in the third set of potential paths in that each potential path had different protection characteristics.

27. The computer program product of claim 22 wherein the first protection characteristic is different from the second protection characteristic.

28. An apparatus for computing a primary path within a network with a mixed protection domain, the network including a plurality of nodes, the apparatus comprising:
   means for identifying a plurality of potential paths which begin at a first node and end at a second node, the plurality of potential paths including a first set of potential paths that have a first protection characteristic and a second set of potential paths that have a second protection characteristic;
   means for selecting a first potential path from the first set of potential paths;
   means for selecting a second potential path from the second set of potential paths; and
   means identifying a path for use in transferring a signal between the first node and the second node, the path for use in transferring the signal being identified from a third set of potential paths which includes the first potential path and the second potential path and substantially no other potential paths included in the first set of potential paths and the second set of potential paths.

29. The apparatus as recited in claim 28 wherein the means for selecting the first potential path from the first set of potential paths includes:
   means for determining costs associated with each potential path from the first set of potential paths, wherein a cost associated with the first potential path is lower than the costs associated with other potential paths in the first set of potential paths.

30. The apparatus as recited in claim 28 wherein the means for selecting the second potential path from the second set of potential paths includes:
   means for determining costs associated with each potential path from the second set or potential paths, wherein a cost associated with the second potential path is lower than the costs associated with other potential paths in the second set of potential paths.

31. The apparatus as recited in claim 28 wherein the means for identifying the path for use in transferring the signal includes:
   means for evaluating a cost associated with each potential path in the third set of potential paths, wherein a potential path included in the third set of potential paths has an associated cost that is lower than costs associated with other potential paths included in the third set or potential paths, the potential path is identified as the path for use in transferring the signal.

32. The apparatus as recited in claim 28 wherein substantially each potential path included in the third set of potential paths is characteristically different from substantially every other potential path included in the third set of potential paths in that each potential path has different protection characteristics.

33. The apparatus as recited in claim 28 further including:
   means for placing the first potential path and the second potential path in the third set of potential paths.

34. The apparatus of claim 28 wherein the first protection characteristic is different from the second protection characteristic.

* * * * *